April 23, 1963 A. SIMMON ETAL 3,086,709
DENSITY CONTROL FOR PHOTOGRAPHIC ENLARGERS
Filed Feb. 17, 1960 4 Sheets-Sheet 1
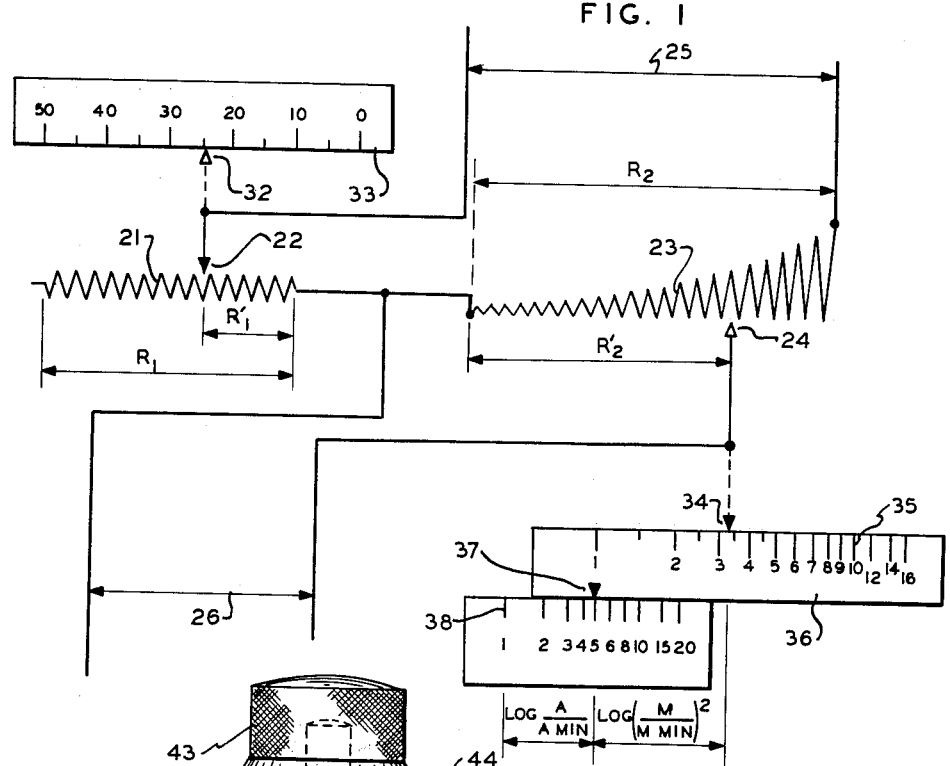
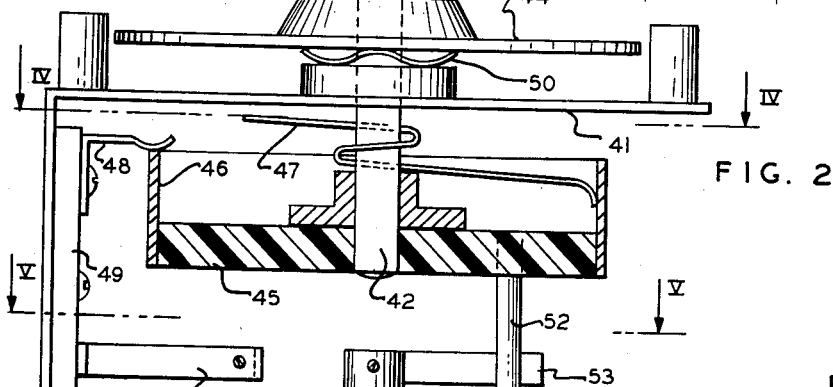
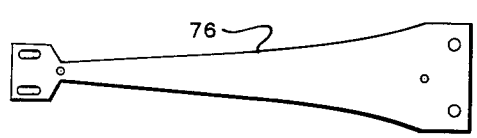
INVENTORS
ALFRED SIMMON
LOUIS L. WEISGLASS
BY
ATTORNEY April 23, 1963 A. SIMMON ETAL 3,086,709
DENSITY CONTROL FOR PHOTOGRAPHIC ENLARGERS
Filed Feb. 17, 1960 4 Sheets-Sheet 2

INVENTORS
ALFRED SIMMON
LOUIS L. WEISGLASS
ATTORNEY

April 23, 1963 A. SIMMON ETAL 3,086,709
DENSITY CONTROL FOR PHOTOGRAPHIC ENLARGERS
Filed Feb. 17, 1960 4 Sheets-Sheet 3

INVENTORS
ALFRED SIMMON
LOUIS L. WEISGLASS
BY
ATTORNEY

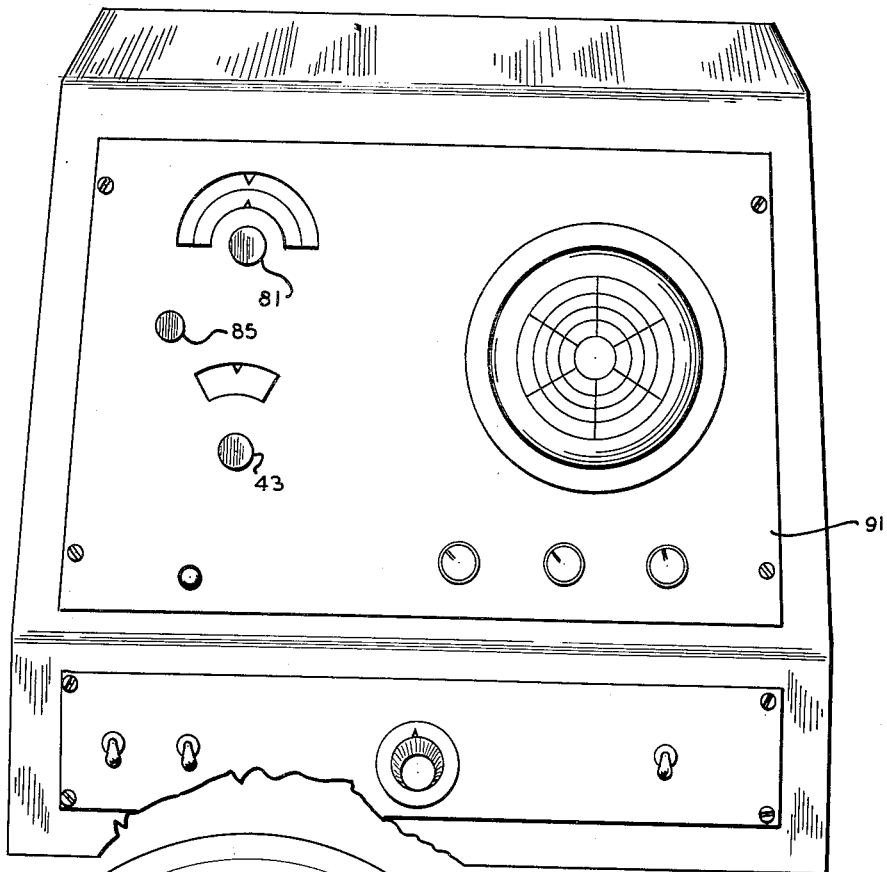
FIG. 11
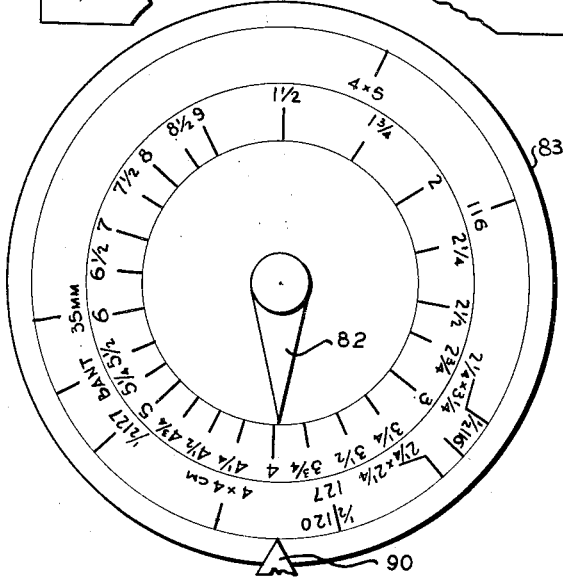
FIG. 9
INVENTORS
ALFRED SIMMON
LOUIS E. WEISGLASS
BY
ATTORNEY United States Patent Office 3,086,709
Patented Apr. 23, 1963

3,086,709
DENSITY CONTROL FOR PHOTOGRAPHIC
ENLARGERS
Alfred Simmon, Garden City, and Louis L. Weisglass,
New York, N.Y., assignors to Simmon Brothers, Inc.,
New York, N.Y., a corporation of New York
Filed Feb. 17, 1960, Ser. No. 9,265
6 Claims. (Cl. 235—184)

This invention relates to an electrical network, for use as an analog computer adapted to generate a voltage proportional to the light flux required to pass a lens of a photographic enlarger in order to produce a print of desired density.

An object of our invention is to produce a computing element which forms a part of a complete control device for photographic enlargers.

Another object of our invention is to produce an analog computer which assures a correct density of a photographic print which is to be produced.

A further object of our invention is to produce an electrical network adapted to generate a voltage proportional to the current which must pass through a photoelectric cell placed in front of an enlarger lens in order to obtain a print of the desired density.

The current of such a photoelectric cell is, of course, proportional to the light flux passing through the lens. Assuming that the paper upon which the print is to be made is of standard sensitivity, the light flux needed for a satisfactory print is a function of the magnification ratio, the size of negative, or more accurately, the size of the aperture of the negative holder, and the exposure time.

The enlarger is assumed to be of the usual type which projects an image of a photographic negative upon a sheet of sensitized paper held on an easel. The instrument, which is the object of the present invention, employs a photoelectric cell to adjust the amount of light to be employed therewith in accordance with the determined output voltage, as will be explained, and the value of which may be indicated upon a suitable voltmeter connected across the output terminals.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a wiring diagram of a network embodying our invention, showing how the desired output voltage is determined upon connecting a predetermined potential to the input terminals of said network.

FIGURE 2 is a sectional view, with parts in elevation, of a combination rheostat and timer embodying our invention.

FIGURE 9 is a detailed plan of the dial of the potentiometer of FIGURES 7 and 8.

FIGURE 10 is a detailed plan of the resistance element which may be used in the potentiometer.

FIGURE 11 is a perspective view of a complete control device embodying an analog computer built in accordance with applicants' invention.

Figure 3:
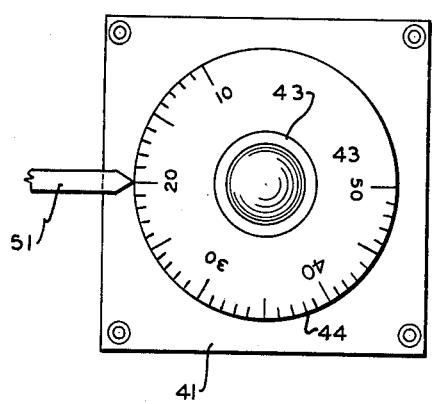
FIGURE 3 is a plan of the rheostat and timer shown in FIGURE 2.

Referring to the drawings in detail, let us first consider a numerical example. Assuming that a negative of a certain size, say 2″ x 3″, is placed in an enlarger which is adjusted to a two times magnification, and that the diaphragm of the enlarger lens is adjusted to a certain opening, say F:8. A photocell placed in front of the lens, through which light passes to illuminate a sensitized sheet of paper, will then pass a certain current. If we now replace the 2″ x 3″ or other selected negative by one of half the size, say 1″ x 1½″, and of equivalent density, the photocell will register the fact that it then receives only one quarter of the light which it formerly received and the photocell current fall to one quarter of its former value. Such current can be restored to its original value by opening the lens diaphragm to four times its former size, say to F:4.

This, however, causes the level of illumination in the plane of the sensitized paper, to become four times as high, or sufficient for double the magnification. In other words, the same photocell current indicates adequate illumination for either a two times magnification of a 2″ x 3″ negative, or a four times magnification of a 1″ x 1½″ negative.

In general terms, the photocell current required for a satisfactory print is proportional to the square of the magnification, proportional to the area of the negative, and inversely proportional to the exposure time (assuming that the exposure times are not varied over an excessively wide range, so that no allowance need to be made for the so-called "failure of reciprocity").

Expressing the above as an equation, we have:

$$I = C \cdot \frac{M^2 A}{T}$$

Where

I is the photocell current
C is a proportionality factor
M is the magnification
A is the area of the aperture of the negative holder
T is the exposure time The output voltage of an analog computer or electrical network, which embodies this invention, is, in turn, proportional to the photocell current I.

Since I is a function of M, A and T, i.e. of three variables, it would seem that any electrical network designed for this situation would have to comprise three potentiometers, rheostats or the like. However, we have found a simple way to reduce the number of needed components to two. This is shown schematically in FIGURE 1. Accordingly, the electrical network comprises a rheostat consisting of a resistor 21 and a movable contact 22, and a potentiometer consisting of a resistor 23 and a movable contact 24. A predetermined constant input voltage, represented by the line 25, is connected between the moving contact 22 and one end of the resistor 23. The other end of the resistor 23 is connected to one end of the resistor 21. The desired output voltage represented by the line 26 is derived between the left end of the resistor 23 and the movable contact 24. The movable contact 22 is mechanically connected to a mark or pointer 32 that coacts with a stationary scale 33 that is calibrated in seconds denoting exposure time.

The voltage impressed upon the resistor 23 is inversely proportional to $R_2$ plus $R_1$, where $R_2$ is the resistance of 23 and $R_1'$ the resistance of a portion of the resistance $R_1$ of element 21, from its right end to the movable contact 22. If we now make the time values on scale 33 proportional to the corresponding values $R_2$ plus $R_1'$, the voltage across 23 becomes also inversely proportional to the exposure time to which contact 22 has been adjusted.

The enlarger, with which the density control apparatus of our invention may be embodied, may be of the general type shown in FIGURE 1, for example, of the Simmon et al. Patent No. 2,430,253, dated November 4, 1947. As in that patent, there is a photoelectric cell employed in front of the larger lens in order to make it possible to adjust the light emanating therefrom for making a print, and the value of the light through said lens is made proportional to the output voltage determined by the network and associated apparatus to be now described, as measured, for example, by a suitable voltmeter.

The current of said cell is, of course, proportional to the light flux passing through said lens. Assuming that the sensitized paper upon which the print is to be made, is of standard sensitivity, the light flux needed for a satisfactory print is a function of the modification ratio, the approximate size of the negative, or more accurately, the size of the aperture of the negative holder, and the exposure time. The "reciprocity law" is well known in the field of photography and refers to the fact that the same density of a finished photographic print should be produced so long as the product of time and intensity remains the same. However, with the advent of color printing, an additional factor, namely, color-balance, was introduced along with that of density which phenomenon is now commonly referred to in the art as "failure of reciprocity."

It was, up to now, assumed that it was unnecessary to provide any compensation for the so-called "failure of reciprocity." For certain color papers now available this is not quite true because they appear to have—for a relatively long exposure time of 40 sec.—approximately 20% less sensitivity than for a relatively short time of say 10 seconds. This can be compensated for by making the resistance value of the resistor $R_1$ somewhat smaller than indicated by the following equation. Making exposure times proportional to $R_2$ plus $R_1'$ means that $$\frac{T \max.}{T \min.} = \frac{R_2 \text{ plus } R_1}{R_2} \text{ or } R_1 = R_2\left(\frac{T \max.}{T \min.} - 1\right)$$

If we now make the corrected resistance $R_{10}$ smaller than $R_1$ (as for example, $R_{10} = .8R_1$) we obtain a condition in which output voltages still become susbtantially inversely proportional to exposure times as long as these times are short, but become progressively larger than distated by said inverse proportion for longer times, thereby compensating for the characteristics of the paper.

The movable contact 24 is mechanically connected to a mark or pointer 34 which coacts with a scale 35 which is affixed to a slidable support 36. Affixed to the same support is another mark 37 which in turn coacts with another stationary scale 38.

The divisions of scale 35 are spaced in accordance with the logarithms of $$\left(\frac{M}{M \min.}\right)^2$$

where M is the magnification to which the system is adjusted, and M min. the smallest possible magnification within the range of the device. Similarly, the divisions of scale 38 are spaced in accordance with the logarithms of $$\left(\frac{A}{A \min.}\right)$$

where A is the area of the negative that is used by its holder, and A min. the area of the smallest negative that is so used. In other words, a slide rule is formed by mark 34, scale 35, mark 37 and scale 38, and the horizontal distance between the origin of scale 38 and mark 34 becomes proportional to $$\text{Log}\left(\frac{M}{M \min.}\right)^2 \text{ plus Log}\left(\frac{A}{A \min.}\right)$$

and this expression is, of course, a function of $M^2A$.

If the element 23 is shaped in such a way that resistance values at every point become reciprocally proportional—not to the expression Log $$\left(\frac{M}{M \min.}\right)^2 \text{ plus Log}\left(\frac{A}{A \min.}\right)$$

—but directly to $M^2A$, as indicated by the values on scales 38 and 35, the voltage across the portion of the resistor 23 between its left end and contact 24, becomes proportional to $M^2A$. We have in FIGURE 1 schematically shown the shape of the resistor 23 which is proportional to that expression, as needed to achieve this objective.

It has already been pointed out that the voltage across the entire resistance 23 ($=R_2$) is inversely proportional to the exposure time to which the rheostat formed by 21 and 22 has been adjusted. The same is, of course, true with respect to the portion of said resistance between its left end and its contact 24, and this output voltage is, therefore, proportional to $$\frac{1}{T}$$

as well as to $M^2A$, i.e., it is proportional to $$\frac{M^2A}{T}$$

We would like to call attention to one important advantage of the arrangement shown schematically in FIGURE 1. At first glance one may assume that the (horizontal) length of resistor 23 must be made equal to the sum of the length of the scales 35 and 38. Actually, it can be a great deal shorter since it is not necessary to provide all magnifications for all negative sizes. To illustrate this, a 10× magnification of a 4″ x 5″ would be 40″ x 50″; i.e., absurdly large, whereas a 1× magnification of a .35 mm. negative would not be much larger than a postage stamp. In practice it is, thus, sufficient to have only relatively small magnifications available for large negatives, and only fairly large magnifications for small negatives. By this expedient, mechanical and electrical dimensions of the device can be reduced very significantly.

In a practice embodiment of this device, as distinguished from the arrangement shown schematically in FIGURE 1, certain obvious changes may be made. The linear movement shown in FIGURE 1 may be replaced by mechanically more convenient rotary motions. The position of some marks and scales relative to each other has been reversed, as is, of course, prefectly permissible. As long as one is moved with respect to the other, it makes no difference which one is moving and which one is stationary. The same holds true with respect to contacts and resistors, as it is sometimes more convenient to keep a contact stationary and move the resistor than vice versa.

The rheostat adjusting the output voltage in inverse proportion to the selected exposure time is preferably operatively connected to the timer, or time switch, so that the operator, when setting the exposure time, automatically adjusts the output voltage of the network which is ascertained in accordance with the invention. While the timer itself may be of conventional construction and form no part of this invention, the combination of the novel rheostat and timer is, for the sake of completeness, shown in FIGURES 2 to 6, inclusive.

A bracket 41 supports a shaft 42 which carries a knurled knob 43 with a dial 44, and a disc 45 made from insulating material. This disc supports a resistor or resistance element 46, which corresponds to resistor 21 of FIGURE 1, and consists of an elongated sheet of flexible insulating material upon which a large number of convolutions of resistance wire have been wound. One end, corresponding to the right end of 21, is connected, to provide one pole of the output voltage, by means of a flexible wire 47, and a resilient contact spring 48, corresponding to element 22 in FIGURE 1, is supported by an insulating block 49 and makes sliding contact with resistor 46. Accidental rotation of the shaft 42 is prevented by friction introduced as by a spring washer 50. A stationary pointer or mark 51 registers with the above-mentioned dial 44.

A pin or other suitable projection 52 is affixed to the disc 45 and forms a stop that determines the zero position of the timer by restricting the movement of the arm 53. This arm is biased by a spiral-shaped spring 54 and, during operation, rotated in a counterclockwise direction against the force of said spring by a synchronous motor 55. This motor has a built-in clutch or the like which is energized during the exposure and deenergized at termination of exposure time, permitting arm 53 to return under the influence of spring 54, in a clockwise direction to the starting position shown in FIGURE 5. A pair of normally closed contacts 56 is mounted on the insulating block 49 so as to be in the path of movement of the arm 53 and thus opened thereby at the end of such movement.

Figure 6:
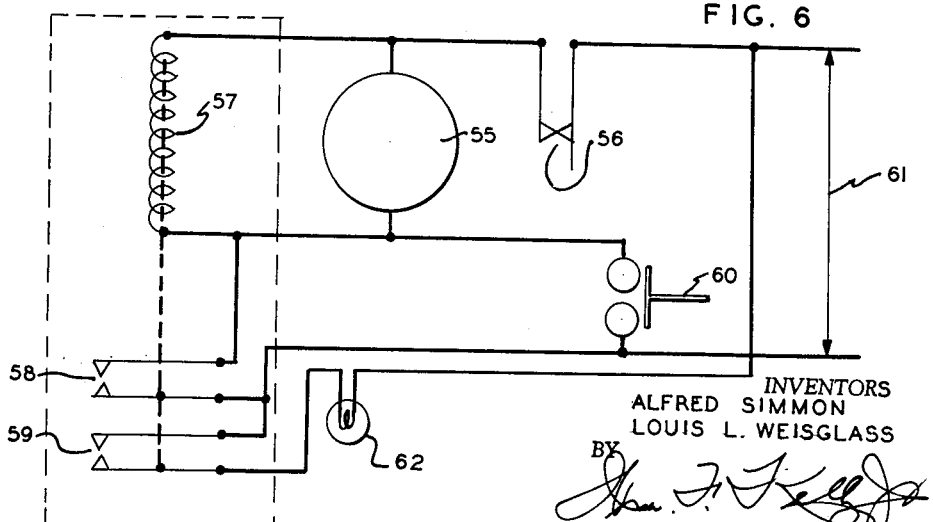
FIGURE 6 is a wiring diagram of the apparatus shown in FIGURES 2 to 5, inclusive.

The circuit, shown in FIGURE 6, comprises, in addition to the elements just described, a relay with a coil 57 for controlling two pairs of normally open contacts, 58 and 59, respectively, and a push button 60. Upon depression of said push button 60 the relay coil 57 is energized from a suitable source of power, represented by the line 61, through the contacts 56, and contacts 58 and 59 are closed. The latter contact keeps the relay coil energized even after the operator relinquishes push button 60. The synchronous motor 55 is energized at the same time, causing arm 53 to rotate in a counter clockwise direction until it hits the longer one of the normally closed contacts 56 and separates said contacts. This deenergizes the relay coil 57 and the motor 55 with its built-in clutch, whereupon the arm 53 returns in a clockwise direction until it is stopped by pin 52.

Figure 5:
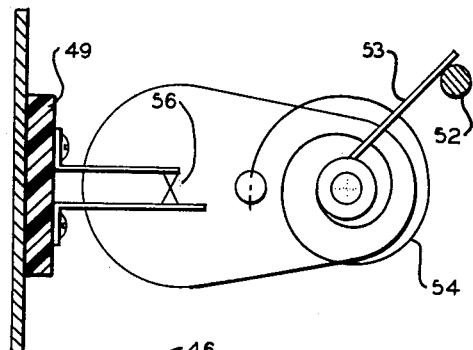
FIGURE 5 is a horizontal sectional view on the line V—V of FIGURE 2, in the direction of the arrows.
Figure 4:
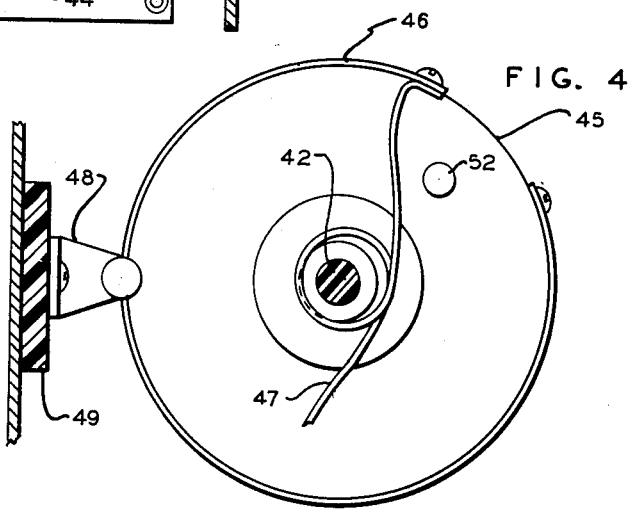
FIGURE 4 is a horizontal sectional view on the line IV—IV of FIGURE 2, in the direction of the arrows.

The angle of rotation of arm 53 between its starting (and return) position shown in FIGURE 5 and the position in which it opens contact 56, determines the exposure time, which the operator may adjust by turning knob 43 and thereby adjusting stop pin 52. The normally open contacts 59 are in series with the lamp 62 within the enlarger.

A preferred embodiment of the potentiometer for the adjustment of negative size and magnifications is shown in FIGURES 7, 8, 9 and 10.

Figure 7:
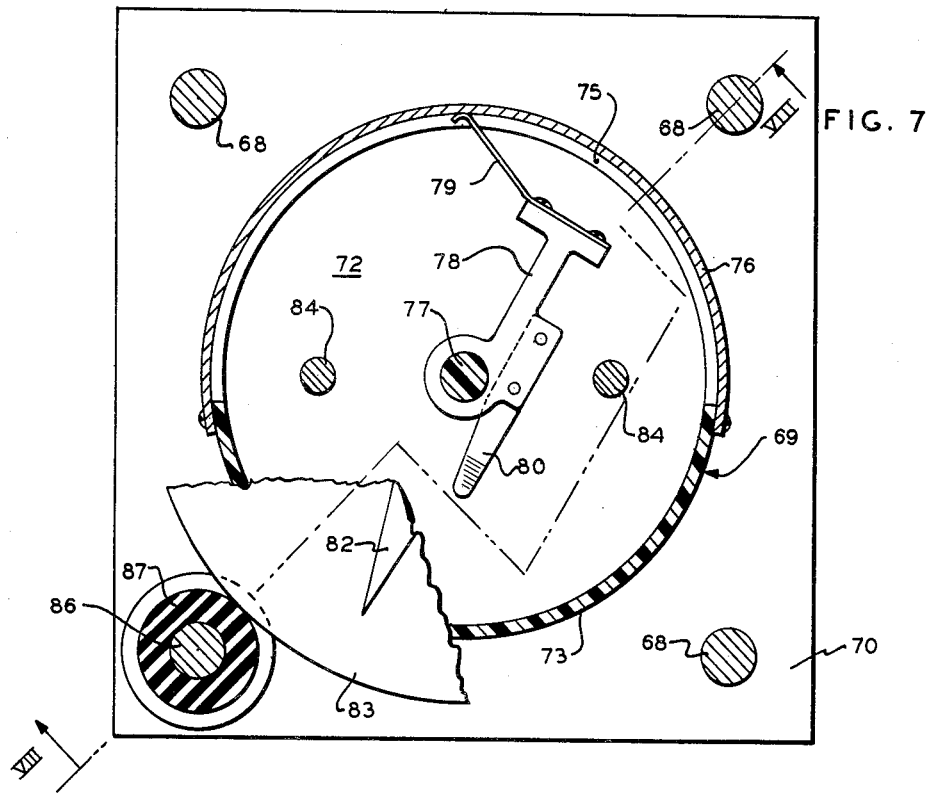
FIGURE 7 is a horizontal sectional view on the line VII—VII of FIGURE 8, with parts in plan, of a preferred embodiment of the potentiometer for the adjustment of negative size and magnification.
Figure 8:
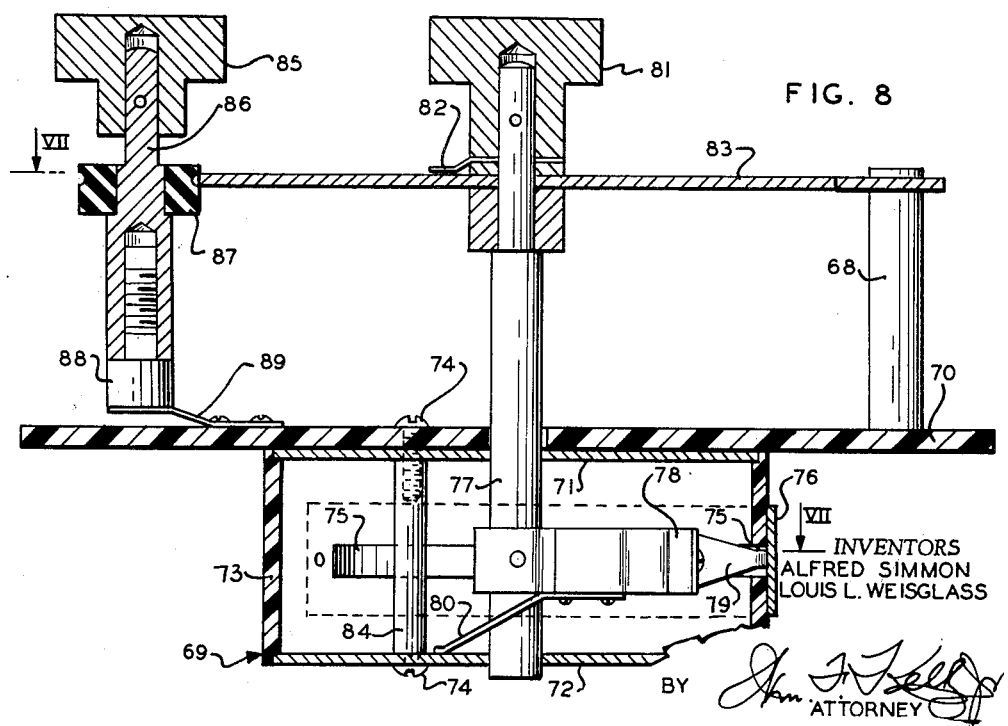
FIGURE 8 is a vertical sectional view on the line VIII—VIII of FIGURE 7, with parts in elevation.

Referring now to FIGURES 7 and 8, a base plate 70 made from insulating material carries a drum 69 consisting of two circular metal plates 71 and 72 and a hollow cylinder 73 made from insulating material. The two metal plates are held together by means such as screws 74 passing therethrough and threaded into cylindrical separating members 84. The cylinder 73 has a narrow elongated slot 75 which extends, as shown in FIGURE 7, slightly more than 180° and is closed by a resistor or resistance element 76 which is of peculiar configuration as will be explained.

The resistor 76 consists of a "card" made from a flexible insulating sheet upon which a number of convolutions of resistance wire have been wound. In the center of the drum 69 is a rotatable shaft 77 made from insulating material and carrying a metal bracket 78 on which is mounted two resilient contact springs 79 and 80 enclosed within the drum. A knurled knob 81 with a pointer 82 are secured to the upper end portion of the shaft 77 and a dial 83 is held above the base plate 70 by means such as posts 68. The spring 79 makes a sliding contact with the resistance element 76 through slot 75, and spring 80 is in contact with metal plate 72. This arrangement is the equivalent of contact 24 and resistor 23 in FIGURE 1.

The pointer 82 is fixedly attached to knob 81 and shaft 77, but the dial 83 is free to rotate relative to either. Its position may be adjusted by the operator by means of a friction drive comprising a knob 85, a shaft 86 and a friction wheel 87 which is preferably made from rubber or the like and which is in contact with the peripheral or circumferential edge of said dial 83. The lower end portion of shaft 86 is hollow and engaged and resiliently supported by a second shaft 88 by a leaf spring 89. This spring 89 provides a certain pressure between fricton wheel 87 and dial 83 which is necessary for the proper functioning of the friction drive therebetween.

The dial 83 is shown in detail in FIGURE 9. It is a circular disc carrying two concentric scales, the inner one denoting magnification ratios, and the outer one carrying notations which are in effect negative areas but which—for the convenience of the operator—are designations by which certain film sizes are known commercially. The angular spacing of the inner scale is in accordance with values of $$\mathrm{Log}\left(\frac{M}{M\,\mathrm{min.}}\right)^2$$

and the corresponding angular spacing of the outer scale is in accordance with values of $$\mathrm{Log}\left(\frac{A}{A\,\mathrm{min.}}\right)$$

The inner scale coacts with pointer 82, while the outer scale coacts with a stationary mark or pointer 90, as shown in FIGURE 9.

The "card" of resistance element 76 is shown in FIGURE 10, since its shape may require some explanation. Assuming that the resistance wire is wound with uniform spacing, the shape of said "card" is very nearly described by an exponential function, i.e.

$$Y=a^x$$

where $Y$ is its (vertical) width at a (horizontal) distance $x$ from the origin (left in FIGURES 1 and 9) and $a$ is a constant depending upon the desired mechanical and electrical dimensions. (The slight departure from the true exponential shape is due to the fact that the card cannot be infinitely thin.)

The explanation for the exponential shape is quite simple: the resistance ($R$) of element 76 is proportional to its area, or $R$ is proportional to $\int y dx = \int a^x dx$. Aside from a constant factor, this integral equals $a^x$; i.e., $R$ is proportional to $a^x$, or $x$ is proportional to log $R$, which means that we need logarithmically spaced scales.

The shape of the card as shown in FIGURE 10 is preferable to the configuration schematically shown in FIGURE 1. The reason for this is the smaller slope at the right end. This slope is a limiting factor because the wire will slip off if it becomes too steep. Halving it, as we do in FIGURE 10, as compared to FIGURE 1, means that we can go to a higher value of $x$ (in the formula $Y=a^x$) before reaching the danger point.

For the sake of completeness, we have shown in FIGURE 11 a cabinet housing a control device comprising an analog computer built according to this invention, and associated devices. The knob 43 and dial associated with the timer-rheostat combination may be seen at the lower left, and the negative size and magnification control, with knobs 81 and 85, at the upper left of the large inclined front panel 91. At the right side of this panel is a plastic dome which is part of a color control device. The dome forms no part of this invention and has been the subject of a separate disclosure.

Having now described the invention in detail in accordance with the requirements of the patent statutes, those

We claim:
1. A control device for photographic enlargers in order to produce a print of predetermined density comprising:
   (a) a timer equipped with an adjustable element adapted to be set by an operator to preselect exposure times,
   (b) an analog computer operable in response to presetting by the operator to generate a voltage proportional to the light flux required to pass the lens of the photographic enlarger to produce the print of predetermined density,
   (c) said analog computer comprising indicating means provided with two scales movable relative to each other and each provided with a pointer, the first scale being graduated to denote magnification ratios, the second scale being graduated to denote negative film areas, and a third scale calibrated in exposure-time values and in registry with the adjustable element of said timer,
   (d) an electrical network including a rheostat and a potentiometer, each one consisting of a resistor and a contact movable relative to each other with the contact of said potentiometer being connected to the pointer of said first scale and simultaneously movable by an operator whereby said potentiometer is adjusted to produce a voltage in accordance with a preselected magnification ratio as indicated by the pointer on said first scale, and one end of each resistor being interconnected;
   (e) means for impressing a predetermined input voltage between the contact of said rheostat and one end of the resistor of said potentiometer,
   (f) means to derive an output voltage from the contact of said potentiometer and the interconnected ends of said resistors,
   (g) and the pointer of said rheostat and the adjustable element of said timer being connected together to cause said rheostat to be automatically adjusted to vary the output voltage when the operator preselects a desired exposure time on said third scale.

2. A control device for photographic enlargers as set forth in claim 1 wherein the third scale of said indicating means is calibrated in exposure-time values as substantially proportional to $R_2$ plus $R'_1$ where $R_2$ is the resistance value of the potentiometer resistor and $R'_1$ is the resistance value of that portion of said rheostat resistor between its contact and the end thereof interconnected with the resistor of said potentiometer whereby the output voltage derived from said last mentioned means is substantially inversely proportional to the exposure-time value as preset on said indicating means.

3. A control device for photographic enlargers as set forth in claim 1 wherein the third scale of said indicating means is calibrated in exposure-time values and the total value of the rheostat resistor having its contact in registry with said indicating means is substantially $$R_1 = R_2\left(\frac{T \text{ max.}}{T \text{ min.}} - 1\right)$$

where
$R_1$ is said total resistance value of the rheostat resistor,
$R_2$ the total resistance value of said potentiometer resistor,
T max. the longest exposure time within the range of the device, and
T min. the shortest exposure time within the range of the device.

4. A control device for photographic enlargers as set forth in claim 1 wherein the third scale of said indicating means is calibrated in exposure-time values and the total value of the rheostat resistor $R_1$ having its contact in registry with said indicating means is smaller than $$R_2 = \left(\frac{T \text{ max.}}{T \text{ min.}} - 1\right)$$

where
$R_2$ is the resistance of said potentiometer resistor, and T max. and T min. are, respectively, the maximum and minimum exposure times, whereby compensation is made for failure of the reciprocity law for the sensitized material being used to make the photographic print.

5. A control device for photographic enlargers as set forth in claim 1 wherein said indicating means is operatively connected to said potentiometer and comprises four elements, two being scales with each having a coacting mark, the first of said elements being connected to the movable part of said potentiometer, two other of said elements being affixed to a common support movable with respect to said first element, and the last of said elements being stationary, and the maximum displacement of the two parts of said potentiometer relative to each other being smaller than the sum of the maximum displacement of the mark element of said indicating means relative to their respective scale elements, whereby the electrical network may be adjusted for relatively large magnification when small film negatives are used and for relatively small magnification when large film negatives are used.

6. A control device for photographic enlargers as set forth in claim 1 wherein said potentiometer is logarithmically attenuated, its resistance values between its contact and its end from which said output voltage is derived being in accordance with the logarithmic value of the displacement of said contact with respect to one end, the magnification ratio graduations of said first scale being spaced in accordance with the values of $$\text{Log}\left(\frac{M}{M \text{ min.}}\right)^2$$

where M is the magnification ratio to which said enlarger is adjusted and M min. the smallest magnification within the range of the device, and the negative film area graduations of said second scale being spaced in accordance with the values of $$\text{Log}\left(\frac{A}{A \text{ min.}}\right)$$

where A is the area of the negative to be enlarged, and A min. the area of the smallest negative to be used, whereby a slide-rule like device is formed, the combination of said slide-rule like device and said potentiometer being thereby adapted to be preset to render said output voltage proportional to the product of the square of the magnification and the area of the film negative.

References Cited in the file of this patent
UNITED STATES PATENTS

| | | |
|---|---|---|
| 2,430,253 | Simmon et al. | Nov. 4, 1947 |
| 2,500,460 | Hunt | Mar. 14, 1950 |
| 2,938,669 | Henry | May 31, 1960 |